United States Patent [19]
Koch

[11] Patent Number: 6,029,360
[45] Date of Patent: Feb. 29, 2000

[54] MULTI-ANGLE POCKET LEVEL

[76] Inventor: Robert E. Koch, P.O. Box 1635, Willits, Calif. 95490

[21] Appl. No.: 08/865,077

[22] Filed: May 29, 1997

Related U.S. Application Data

[60] Provisional application No. 60/030,441, Nov. 13, 1996.

[51] Int. Cl.7 ................................................. G01C 9/34
[52] U.S. Cl. ............................................... 33/382; 33/381
[58] Field of Search ............................. 33/382, 376, 377, 33/381, 384, 389, 395, 451, 529

[56] References Cited

U.S. PATENT DOCUMENTS

| | | | |
|---|---|---|---|
| D. 159,254 | 7/1950 | Daudelin | D52/1 |
| 161,155 | 3/1875 | Ransom . | |
| D. 186,284 | 10/1959 | Hoeh | D52/1 |
| D. 349,462 | 8/1994 | Douglas | D10/62 |
| 2,695,949 | 11/1954 | Ashwill | 33/381 |
| 2,939,947 | 6/1960 | Schultz | 240/6.44 |
| 2,948,067 | 8/1960 | Mistretta | 33/381 |
| 3,435,533 | 4/1969 | Whitfield | 33/382 |
| 4,590,682 | 5/1986 | Koch | 33/383 |
| 4,593,475 | 6/1986 | Mayes | 33/DIG. 1 |
| 4,932,132 | 6/1990 | Baker et al. | 33/366 |
| 5,103,569 | 4/1992 | Leatherwood | 33/379 |
| 5,433,011 | 7/1995 | Scarborough et al. | 33/376 |

FOREIGN PATENT DOCUMENTS

| | | | |
|---|---|---|---|
| 60435 | 11/1968 | Germany . | |
| 2904790 | 8/1979 | Germany . | |
| 1227123 | 4/1971 | United Kingdom | 33/382 |

*Primary Examiner*—Christopher W. Fulton
*Attorney, Agent, or Firm*—Carol D. Titus; James J. Leary

[57] ABSTRACT

A compact level having two spirit level vials visible through either planar face of a triangular body. The vials and triangular body are configured to produce angles including 0°, 15°, 30°, 45°, and 60° and their 90° increments. Each of the three edges of the triangle maybe grooved to aid in leveling or truing pipes or other cylindrical objects. Extending along these grooves are magnets. The magnets may be flat or grooved and are used to aid the user when working with magnetic objects.

22 Claims, 5 Drawing Sheets

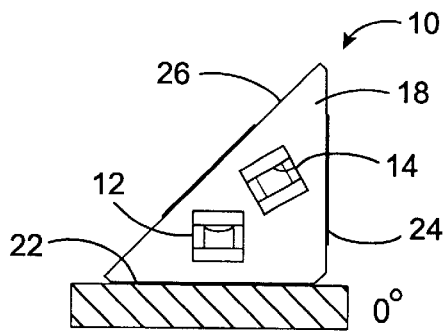 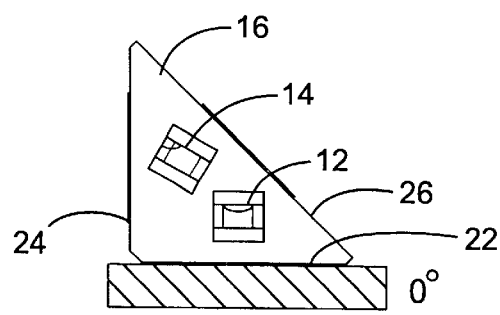
FIG. 2A  FIG. 2B
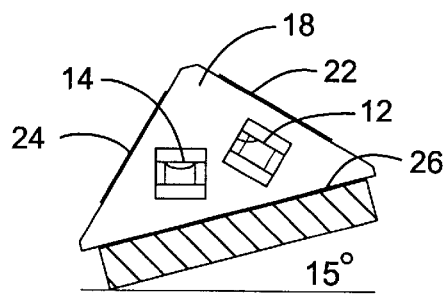 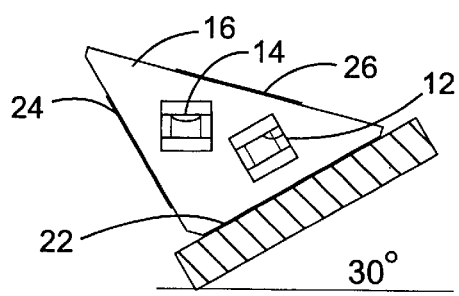
FIG. 2C  FIG. 2D
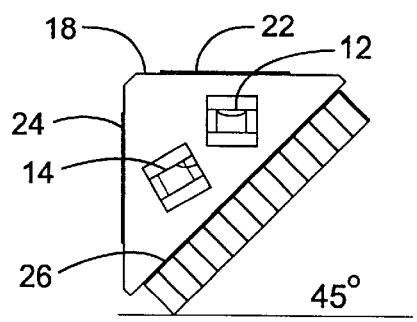 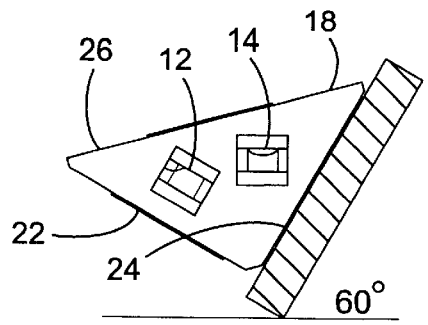
FIG. 2E  FIG. 2F
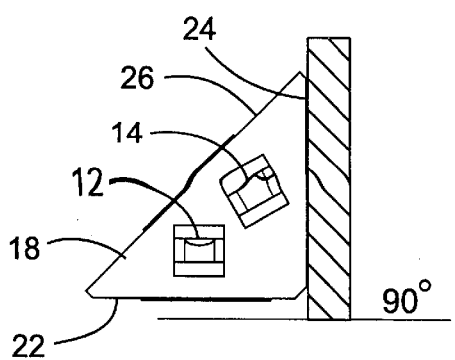 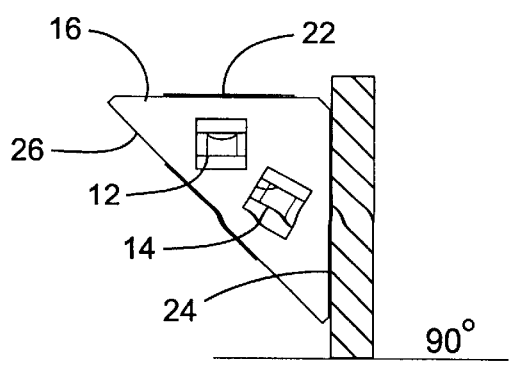
FIG. 2G  FIG. 2H

MULTI-ANGLE POCKET LEVEL

RELATIONSHIP TO OTHER APPLICATIONS

This application claims the benefit of U.S. Provisional Application No. 60/030,441, filed Nov. 13, 1996.

FIELD OF INVENTION

The present invention relates generally to compact spirit levels. More particularly it relates to a pocket sized spirit level device which may be used to verify a plurality of different angles.

BACKGROUND OF THE INVENTION

The original idea of a spirit level was invented many, many decades ago. Since that time new tools have been developed which utilize a spirit level in conjunction with other tools such as tape measures and lights, described in U.S. Pat. Nos. D349,462 and 2,939,947, respectively.

A common spirit level configuration has two levels placed within a level body. The levels are placed at right angles to one another to allow a user to determine deviations from levelness of a surface which is nominally coplanar with the two spirit level vials. Some (examples of level devices of this nature are U.S. Pat. No. 161,155 and German Patent Nos. 29 04 790 and 60 435. A single vial detects only variations which are perpendicular to the vial, but is unlikely to detect variations which are parallel to the vial. Thereby explaining the principle behind having two vials which are at right angles. This configuration most accurately detects any imperfections.

Another variation of leveling devices uses a rotatable spirit level in order to verify and/or level a surface to angles other than zero. In these cases, the vial is rotatably mounted within the level body. However, the rotation procedure adds another opportunity at which error may be introduced. If a user is careless when rotating the vial or must estimate when the vial has been rotated to the proper angle, the vial may not be at the proper orientation and the leveling procedure will not accurately reflect the state of the surface. Examples of this style of level are shown in U.S. Pat. Nos. 4,590,682 and 4,593,475.

SUMMARY OF THE INVENTION

The objective of the present invention is to provide a level that may be used for verifying a multiplicity of different angles, including vertical and horizontal. This is accomplished by placing two spirit level vials at predetermined angles within a triangular body.

Another objective of the present invention is to provide a flat or grooved magnet which can be used as an aid for the leveling, truing, cutting, and bending of metal pipe or other magnetic surfaces and objects.

A further objective of the present invention is to provide a multi-angle level that does not require any moving parts to measure the angles.

Yet another objective of the present invention is to provide a level that is compact and configured to fit easily within a user's pocket.

Another objective of the present invention is to provide a level that has fixed vials and does not require manual adjustment of the vial within the body of the level for verifying a multiplicity of angles. This also avoids a possible source of error which comes from manual adjustment of adjustable vials.

In keeping with these objectives, the present invention takes the form of two spirit level vials visible through both planar faces of a triangular body. The vials and triangular body are configured to produce angles including 0°, 15°, 30°, 45°, and 60° and their 90° increments.

Each of the three edges of the triangle may be grooved to aid in leveling or truing pipes or other cylindrical objects. Extending along these grooves are magnets. The magnets may be flat or grooved and are used to aid the user when working with magnetic objects. Other objects and advantages of the invention will no doubt occur to those skilled in the art upon reading and understanding the following detailed description along with the accompanying drawings.

BRIEF DESCRIPTION OF THE DRAWINGS

FIGS. 2A–2H are side views of the triangular level at different rotations showing the angles of use.

DETAILED DESCRIPTION OF THE INVENTION

Figure 1:
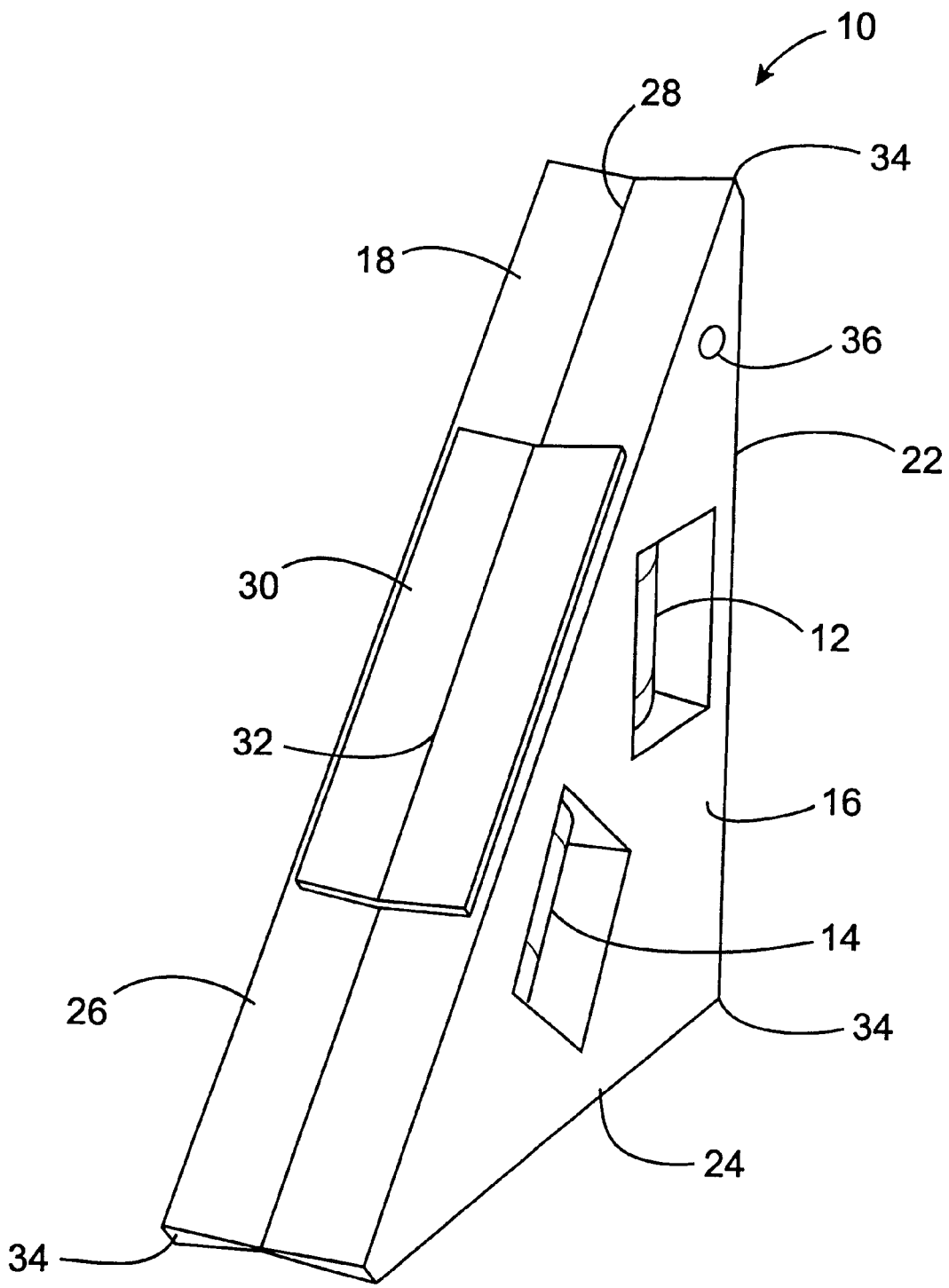
FIG. 1 is a perspective view of the triangular level.

FIG. 1 is a perspective view of the triangular level 10. Two spirit vials 12, 14 are sandwiched between two generally planar, triangular body sections 16, 18. In the present embodiment, these sections 16, 18 are injection molded plastic and are attached together with screws. However, the body may be formed by alternate methods in any relatively sturdy material, including metal and wood. In addition, the two body sections 16, 18 may be attached together in any permanent or semi-permanent way including screws, nails, bolts, and adhesives. For ease of manufacturing, the body could be made as a single unit by prepositioning the two vials within a mold and then molding the entire body of the level as a single piece. This would assure a firm hold on the vials and prevent inadvertent disassembling of the level.

In the embodiment shown, the edges 22, 24, 26 of the level body 10 are grooved 28 and have discrete grooved 32 magnet sections 30 located on each edge 22, 24, 26 of the triangle 10. The magnet sections 30 may be formed of any magnetic material, including ceramic and rubber based magnets. These magnets 30 allow the user to place the level 10 against a pipe or other cylindrical object along its centerline without the level 10 twisting in relation to the object. If the object is made of a magnetic material such as iron, the magnet 30 holds the level 10 in place. This leaves both of the user's hands free to work while leaving the level 10 as a visual indicator of the angle of the object. If preferred, the magnetic sections 30 could be made of flat magnets recessed slightly into the body of the level 10. This would allow the cylindrical object to rest within the groove 28 of the body 10 but still be within the magnetic field of the magnet 30. If preferred, the present invention could be formed without the grooves 28 in the edges 22, 24, 26 and with or without the magnets 30.

The corners 34 of the level 10 are slightly rounded or trimmed to prevent damage to the level 10, the surroundings and the user. This can be especially important in cases where the user places the triangular level 10 in his or her pocket. A hole 36 runs all the way through the level body 10 and is used to hang the level on a wall or partition of a work area.

The body of the level 10 is preferably sized for easy manipulation by a user. More preferably, the body 10 is sized to fit in a compact location such as a pocket. Most preferred, the body of the level 10 is an isosceles right triangle that is approximately ¾ of an inch thick, the two perpendicular edges 22, 24 of the level 10 are approximately 3½ inches long and the hypotenuse edge 26 of the level 10 is approximately 4¾ inches long. If desired, other dimensions and shapes may be used to suit whatever application is required.

When looking at the front planar surface or front face 17 of the level, the first vial 12 is placed parallel to the first edge 22 of the body 10. The second vial 14 is placed at a 150 degree angle to the first edge 22 of the body 10. This means that the first vial 12 is perpendicular to the second edge 24 of the body 10, and the second vial 14 is 60 degrees to the second edge 24 of the body 10. This also implies that the first vial 12 is 45 degrees to the third edge or hypotenuse 26 and the second vial 14 is 15 degrees to the third edge or hypotenuse 26.

OPERATIONAL DESCRIPTION

The triangular level 10 is used by placing the appropriate edge 22, 24, 26 of the level 10 against the surface to be verified and then reading the vial 12, 14 corresponding to the desired angle. If a user is using the level 10 as a construction tool, he or she may then adjust the workpiece until the bubble in the vial 12, 14 is properly centered and then secure the workpiece. If the user is verifying angles, the user would check the bubble in the vial 12, 14 and record the status.

There are many different operational positions of the pocket level 10. Following is a chart of the different angles that the present configuration of level 10 can be used to verify. Column 1 indicates the figure which shows the level 10 in the orientation which is described in a chosen row of Table 1. Column 2 indicates the angle that the values of that row of Table 1 will verify. Column 3 indicates which vial 12, 14 the user should be inspecting to verify the angle give in a particular row of Table 1. Column 4 indicates the face of the level 10, front 16 or back 18, which should be facing the user to verify the chosen angle. Column 5 indicates which edge 22, 24, 26 of the level 10 should be against the surface being measured to verify the chosen angle.

TABLE 1

Figure 3A:
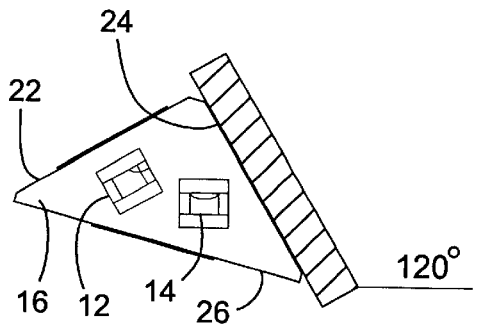
FIGS. 3A–3H are side views of the triangular level at different rotations showing the angles of use.
Figure 3B:
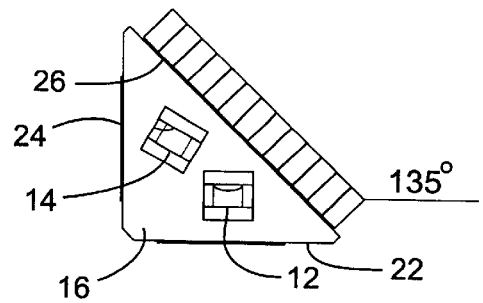
Figure 3C:
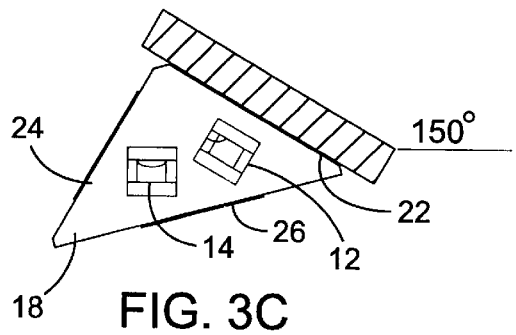
Figure 3D:
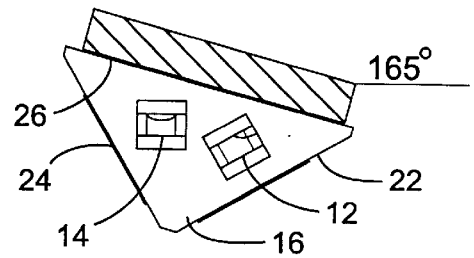
Figure 3E:
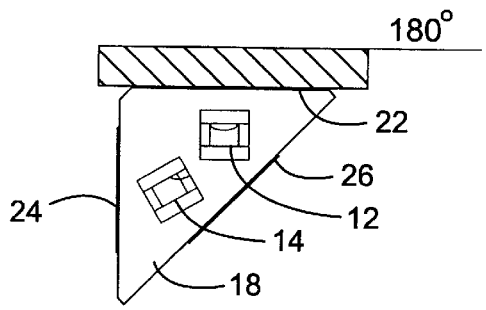
Figure 3F:
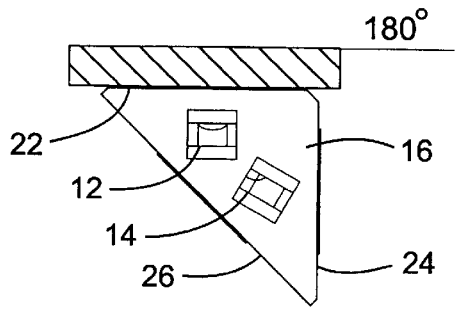
Figure 3G:
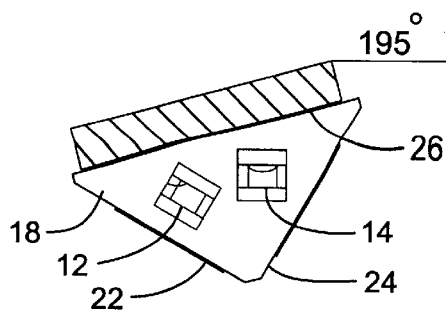
Figure 3H:
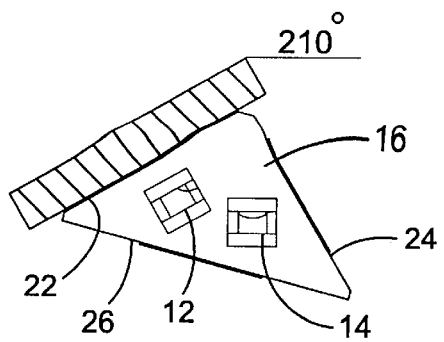
Figure 4A:
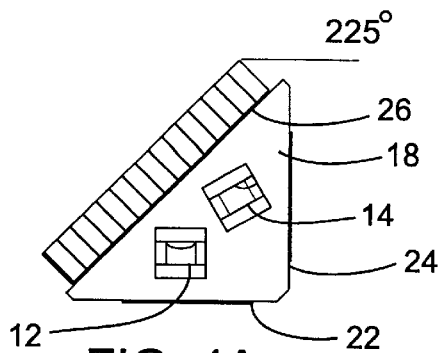
FIGS. 4A–4H are side views of the triangular level at different rotations showing the angles of use.
Figure 4B:
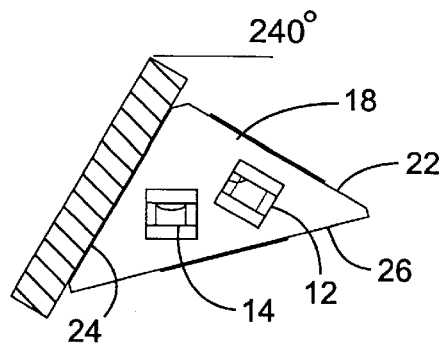
Figure 4C:
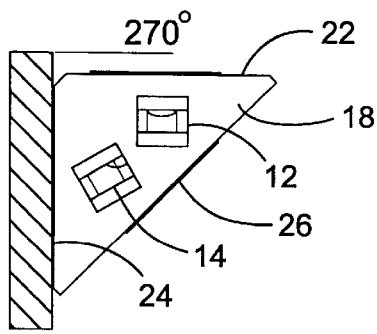
Figure 4D:
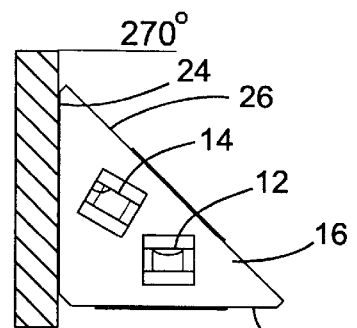
Figure 4E:
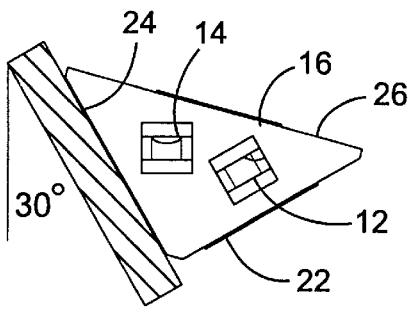

| Column 1 FIG. | Column 2 Angle | Column 3 Vial | Column 4 Front/Back Face | Column 5 Edge |
| --- | --- | --- | --- | --- |
| FIG. 2A | 0° (level) | vial 1 (12) | back (18) | 1st edge (22) |
| FIG. 2B | 0° (level) | vial 1 (12) | front (16) | 1st edge (22) |
| FIG. 2C | 15° | vial 2 (14) | back (18) | 3rd edge (26) |
| FIG. 2D | 30° | vial 2 (14) | front (16) | 1st edge (22) |
| FIG. 2E | 45° | vial 1 (12) | back (18) | 3rd edge (26) |
| FIG. 2F | 60° | vial 2 (14) | back (18) | 2nd edge (24) |
| FIG. 2G | 90° (plumb) | vial 1 (12) | back (18) | 2nd edge (24) |
| FIG. 2H | 90° (plumb) | vial 1 (12) | front (16) | 2nd edge (24) |
| FIG. 3A | 120° | vial 2 (14) | front (16) | 2nd edge (24) |
| FIG. 3B | 135° | vial 1 (12) | front (16) | 3rd edge (26) |
| FIG. 3C | 150° | vial 2 (14) | back (18) | 1st edge (22) |
| FIG. 3D | 165° | vial 2 (14) | front (16) | 3rd edge (26) |
| FIG. 3E | 180° (level) | vial 1 (12) | back (18) | 1st edge (22) |
| FIG. 3F | 180° (level) | vial 1 (12) | front (16) | 1st edge (22) |
| FIG. 3G | 195° | vial 2 (14) | back (18) | 3rd edge (26) |
| FIG. 3H | 210° | vial 2 (14) | front (16) | 1st edge (22) |
| FIG. 4A | 225° | vial 1 (12) | back (18) | 3rd edge (26) |
| FIG. 4B | 240° | vial 2 (14) | back (18) | 2nd edge (24) |
| FIG. 4C | 270° (plumb) | vial 1 (12) | back (18) | 2nd edge (24) |
| FIG. 4D | 270° (plumb) | vial 1 (12) | front (16) | 2nd edge (24) |
| FIG. 4E | 300° | vial 2 (14) | front (16) | 2nd edge (24) |

TABLE 1-continued

Figure 4F:
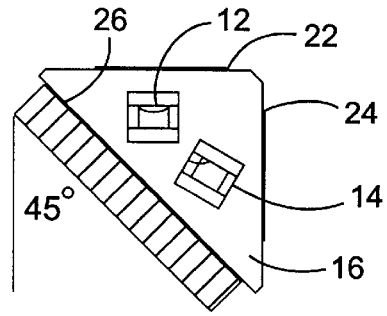
Figure 4G:
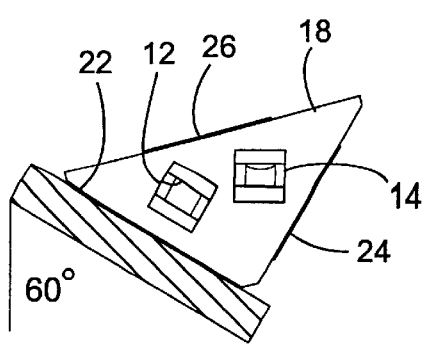
Figure 4H:
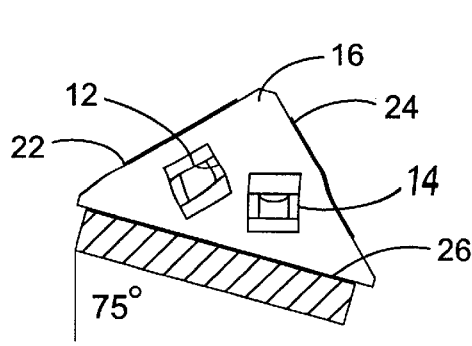

| Column 1 FIG. | Column 2 Angle | Column 3 Vial | Column 4 Front/Back Face | Column 5 Edge |
| --- | --- | --- | --- | --- |
| FIG. 4F | 315° | vial 1 (12) | front (16) | 3rd edge (26) |
| FIG. 4G | 330° | vial 2 (14) | back (18) | 1st edge (22) |
| FIG. 4H | 345° | vial 2 (14) | front (16) | 3rd edge (26) |

The figures showing angles greater than 270°, FIGS. 4E, 4F, 4G, and 4H, are shown as an angle measured from 270°. To obtain the actual angle of the surface in these figures, the angle given is added to 270°.

The table above indicates angles that range from 0° to 345°. As it is easy to determine, the angles which are greater than 180° are easily determined by taking the angles less than 180° and adding 180°.

Depending on the desire of the user there are a couple of different ways to determine the particular combination that will yield the appropriate angle for a current need. The first option is a table, like the one above. If this is the method used, the user would determine the angle they want the object to obtain and then use the information on that particular line to determine which vial 12, 14, whether front 17 or back 19 face of the level 10, and which edge 22, 24, 26 of the triangle 10 they need to use.

Figure 5:
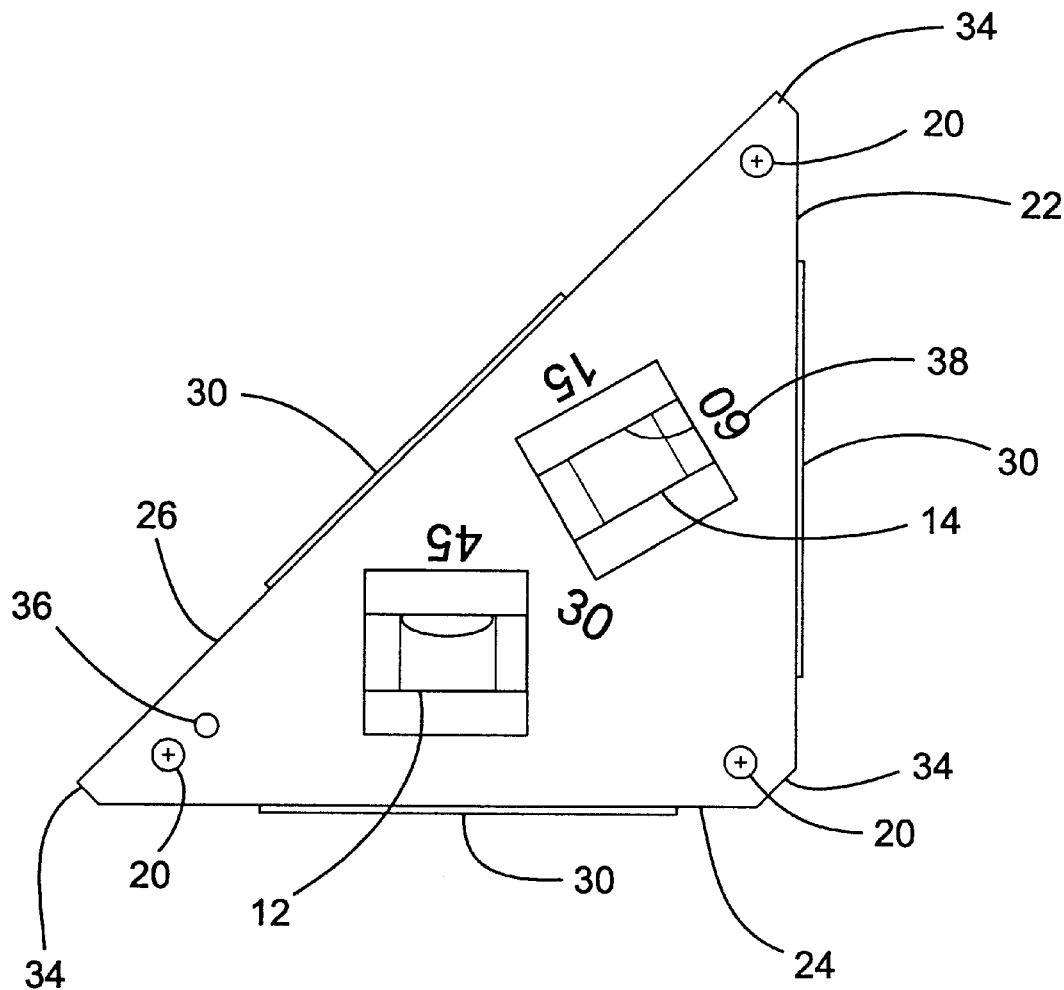
FIG. 5 is a front view of the triangular level showing angle markings.

A second way to make this information available to the user is to print on the level body 10 a set of values 38 which would indicate which combination makes which angle. This would be done in such a way as to allow the user to easily pick out the parameters necessary for a particular angle. An example of this type of marking 38 is found in FIG. 5 which shows the front face 17 of the triangular level 10. If the level 10 is injection molded, the markings 38 can be debossed during the molding process. The markings 38 may also be hot stamped and/or painted or otherwise indicated on the planar surfaces 17, 19 of the level 10. The markings 38 are oriented so that each marking 38 is closest to the vial 12, 14 read for that angle and is near the edge 22, 24, 26 of the vial 12, 14 which corresponds to the edge 22, 24, 26 of the level 10 to be used.

Although the examples given include many specificities, they are intended as illustrative of only one possible embodiment of the invention. Other embodiments and modifications will, no doubt, occur to those skilled in the art. For example, if alternate angles were necessary for a particular industry, one or both of the vials 12, 14 could be placed at the required angles to give the user whatever angle was necessary. Also, the embodiment shown and described uses an isosceles right triangle. If preferred or required, a different configuration of triangle, such as a 30°, 60°, 90° or an irregular triangle, could be used which would also vary the set of angles at which the level 10 could be used. Thus, the examples given should only be interpreted as illustrations of some of the preferred embodiments of the invention, and the full scope of the invention should be determined by the appended claims and their legal equivalents.

I claim:

1. A compact leveling device, comprising:
   a triangular body having a first edge, a second edge and a third edge,
   a first spirit level located within said triangular body,
   a second spirit level located within said triangular body,
   a first angle located between said first edge and said first vial, said first angle being zero degrees;
   a second angle located between said second edge and said first vial, said second angle being a non-zero angle, a third angle located between said third edge and said first vial, said third angle being a non-zero angle, a fourth angle located between said first edge and said second vial, said fourth angle being a non-zero angle, a fifth angle located between said second edge and said second vial, said fifth angle being a non-zero angle, and a sixth angle located between said third edge and said second vial, said sixth angle being a non-zero angle, said triangular body having a first position, wherein in said first position said first edge rests against a surface, and wherein a user may determine if the surface is at said first angle with respect to horizontal and the user may determine if the surface is at said fourth angle with respect to horizontal, said triangular body having a second position, wherein in said second position said second edge rests against the surface, and wherein the user may determine if the surface is at said second angle with respect to horizontal and the user may determine if the surface is at said fifth angle with respect to horizontal, and said triangular body having a third position, wherein in said third position said third edge rests against the surface, and wherein the user may determine if the surface is at said third angle with respect to horizontal and the user may determine if the surface is at said sixth angle with respect to horizontal.

2. The compact leveling device of claim 1 wherein said second angle is 90 degrees.

3. The compact leveling device of claim 1 further comprising at least one marking on said level, said marking indicating the angle between at least one of said first vial and said second vial and at least one of said first, second, and third edges of said leveling device.

4. The compact leveling device of claim 1 further comprising at least one magnet located on at least one of said first, second, and third edges of said level.

5. The compact leveling device of 4 wherein said at least one magnet has a groove running parallel to said at least one of said first, second, and third edges.

6. The compact leveling device of claim 1 wherein said first vial and said second vial are visible from a front surface and a back surface of said triangular body.

7. The compact leveling device of claim 1 wherein said triangular body is an isosceles right triangle.

8. The compact leveling device of claim 1 in combination with a table of values, said table of values comprising:

| Angle | Vial | Front/Back Face | Edge |
| --- | --- | --- | --- |
| 0° (level) | said first vial | a back face | said first edge |
| 0° (level) | said first vial | a front face | said first edge |
| 15° | said second vial | said back face | said third edge |
| 30° | said second vial | said front face | said first edge |
| 45° | said first vial | said back face | said third edge |
| 60° | said second vial | said back face | said second edge |
| 90° (plumb) | said first vial | said back face | said second edge |
| 90° (plumb) | said first vial | said front face | said second edge |
| 120° | said second vial | said front face | said second edge |
| 135° | said first vial | said front face | said third edge |
| 150° | said second vial | said back face | said first edge |
| 165° | said second vial | said front face | said third edge | said angle being measured between one of said first and second vials and one of said first, second, and third edges.

9. The compact leveling device of claim 1 in combination with a table of values, said table of values comprising:

| Angle | Vial | Front/Back Face | Edge |
| --- | --- | --- | --- |
| 0° (level) | said first vial | a back face | said first edge |
| 0° (level) | said first vial | a front face | said first edge |
| 15° | said second vial | said back face | said third edge |
| 30° | said second vial | said front face | said first edge |
| 45° | said first vial | said back face | said third edge |
| 60° | said second vial | said back face | said second edge |
| 90° (plumb) | said first vial | said back face | said second edge |
| 90° (plumb) | said first vial | said front face | said second edge |
| 120° | said second vial | said front face | said second edge |
| 135° | said first vial | said front face | said third edge |
| 150° | said second vial | said back face | said first edge |
| 165° | said second vial | said front face | said third edge |
| 180° (level) | said first vial | said back face | said first edge |
| 180° (level) | said first vial | said front face | said first edge |
| 195° | said second vial | said back face | said third edge |
| 210° | said second vial | said front face | said first edge |
| 225° | said first vial | said back face | said third edge |
| 240° | said second vial | said back face | said second edge |
| 270° (plumb) | said first vial | said back face | said second edge |
| 270° (plumb) | said first vial | said front face | said second edge |
| 300° | said second vial | said front face | said second edge |
| 315° | said first vial | said front face | said third edge |
| 330° | said second vial | said back face | said first edge |
| 345° | said second vial | said front face | said third edge | said angle being measured between one of said first and second vials and one of said first, second, and third edges.

10. The compact leveling device of claim 1 wherein said second angle is a 90° angle, said third angle is a 45° angle, said fourth angle is a 30° angle, said fifth angle is a 60° angle, and said sixth angle is a 15° angle.

11. The compact leveling device of claim 1 wherein said second angle is different from said third, fourth, fifth, and sixth angles, said third angle is different from said fourth, fifth, and sixth angles, said fourth angle is different from said fifth and sixth angles, and said fifth angle is different from said sixth angle.

12. The pocket-sized level of claim 1 wherein said level is configured to measure six different, pre-chosen, pre-set angles, including zero degrees (parallel), 90 degrees, 45 degrees, 30 degrees, 60 degrees, and 15 degrees.

13. A pocket-sized level, comprising:

a triangular body having a first edge, a second edge and a third edge, a first vial located within said triangular body, said first vial parallel to said first edge, perpendicular to said second edge, and at a first angle to said third edge, said first angle being 45 degrees, a second vial located within said triangular body, said second vial located at a second angle to said first edge, at a third angle to said second edge, and at a fourth angle to said third edge, said second angle being 30 degrees, said third angle being 60 degrees, and said fourth angle being 15 degrees.

14. The compact leveling device of claim 13 further comprising at least one marking on said level, said marking indicating the angle between at least one of said first vial and said second vial and at least one of said first, second, and third edge of said leveling device.

15. The compact leveling device of claim 13 further comprising at least one magnet located on at least one of said first, second, and third edge of said level.

16. The compact leveling device of 15 wherein said at least one magnet has a groove running parallel to said at least one of said first, second, and third edge.

17. The compact leveling device of claim 13 wherein said first vial and said second vial are visible from a front surface and a back surface of said triangular body.

18. The compact leveling device of claim 13 wherein said triangular body is an isosceles right triangle.

19. A method of inspecting the angle of a surface comprising the steps of:
  (a) determining a desired angle for the surface;
  (b) selecting a set of parameters of a triangular compact level necessary to measure said desired angle, said set of parameters including a vial chosen from a first vial and a second vial, an edge chosen from a first edge, a second edge and a third edge, and a face chosen from a front face and a back face;
  (c) orienting said level to measure said desired angle by placing the selected edge against the surface with the selected face visible to a user, said set of parameters chosen from:

| Angle | Vial | Front/Back Face | Edge |
|---|---|---|---|
| 0° (level) | said first vial | said back face | said first edge |
| 0° (level) | said first vial | said front face | said first edge |
| 15° | said second vial | said back face | said third edge |
| 30° | said second vial | said front face | said first edge |
| 45° | said first vial | said back face | said third edge |
| 60° | said second vial | said back face | said second edge |
| 90° (plumb) | said first vial | said back face | said second edge |
| 90° (plumb) | said first vial | said front face | said second edge |
| 120° | said second vial | said front face | said second edge |
| 135° | said first vial | said front face | said third edge |
| 150° | said second vial | said back face | said first edge |
| 165° | said second vial | said front face | said third edge |
| 180° (level) | said first vial | said back face | said first edge |
| 180° (level) | said first vial | said front face | said first edge |
| 195° | said second vial | said back face | said third edge |
| 210° | said second vial | said front face | said first edge |
| 225° | said first vial | said back face | said third edge |
| 240° | said second vial | said back face | said second edge |
| 270° (plumb) | said first vial | said back face | said second edge |
| 270° (plumb) | said first vial | said front face | said second edge |
| 300° | said second vial | said front face | said second edge |
| 315° | said first vial | said front face | said third edge |
| 330° | said second vial | said back face | said first edge |
| 345° | said second vial | said front face | said third edge | said angle being measured between one of said first and second vials and one of said first, second, and third edges;
  (d) and inspecting the selected vial to determine if the surface is oriented at said desired angle.

20. The method of claim 19 further comprising the step of:
  (e) magnetically attaching said level to said surface, thereby allowing a user fully use of both hands.

21. The method of claim 20 further comprising the step of:
  (f) adjusting the angle of the surface to said desired angle.

22. A multi-angle pocket leveling device for measuring the angle of inclination of a surface, comprising:
  a triangular body having a first edge, a second edge, a third edge, a front face, and a back face, said first edge being at a 90 degree angle with respect to said second edge, said second edge being at a 45 degree angle with respect to said third edge, and said third edge being at a 45 degree angle with respect to said first edge,
  a first spirit level located within a first opening in said triangular body at a first spirit level location and being oriented at a zero degree angle (parallel) with said first edge of said triangular body, at a 90 degree angle with respect to said second edge of said triangular body, and at a 45 degree angle with respect to said third edge of said triangular body,
  and a second spirit level located within a second opening in said triangular body at a second spirit level location and being oriented at a 30 degree angle with respect to said first edge of said triangular body, at a 60 degree angle with respect to said second edge of said triangular body, and at a 15 degree angle with respect to said third edge of said triangular body,
  said multi-angle pocket level being configured to measure at least six angles of inclination, including:
    a first angle of zero degrees (parallel) by placing the first edge of the triangular body against the surface and inspecting the first spirit level to determine if the surface is horizontal,
    a second angle of 90 degrees by placing the second edge of the triangular body against the surface and inspecting the first spirit level to determine if the surface is vertical,
    a third angle of 45 degrees by placing the third edge of the triangular body against the surface and inspecting the first spirit level to determine if the surface is at a 45 degree angle with respect to horizontal,
    a fourth angle of 30 degrees by placing the first edge of the triangular body against the surface and inspecting the second spirit level to determine if the surface is at a 30 degree angle with respect to horizontal,
    a fifth angle of 60 degrees by placing the second edge of the triangular body against the surface and inspecting the second spirit level to determine if the surface is at a 60 degree angle with respect to horizontal,
    and a sixth angle of 15 degrees by placing the third edge of the triangular body against the surface and inspecting the second spirit level to determine if the surface is at a 15 degree angle with respect to horizontal.

* * * * *